United States Patent Office 2,768,058
Patented Oct. 23, 1956

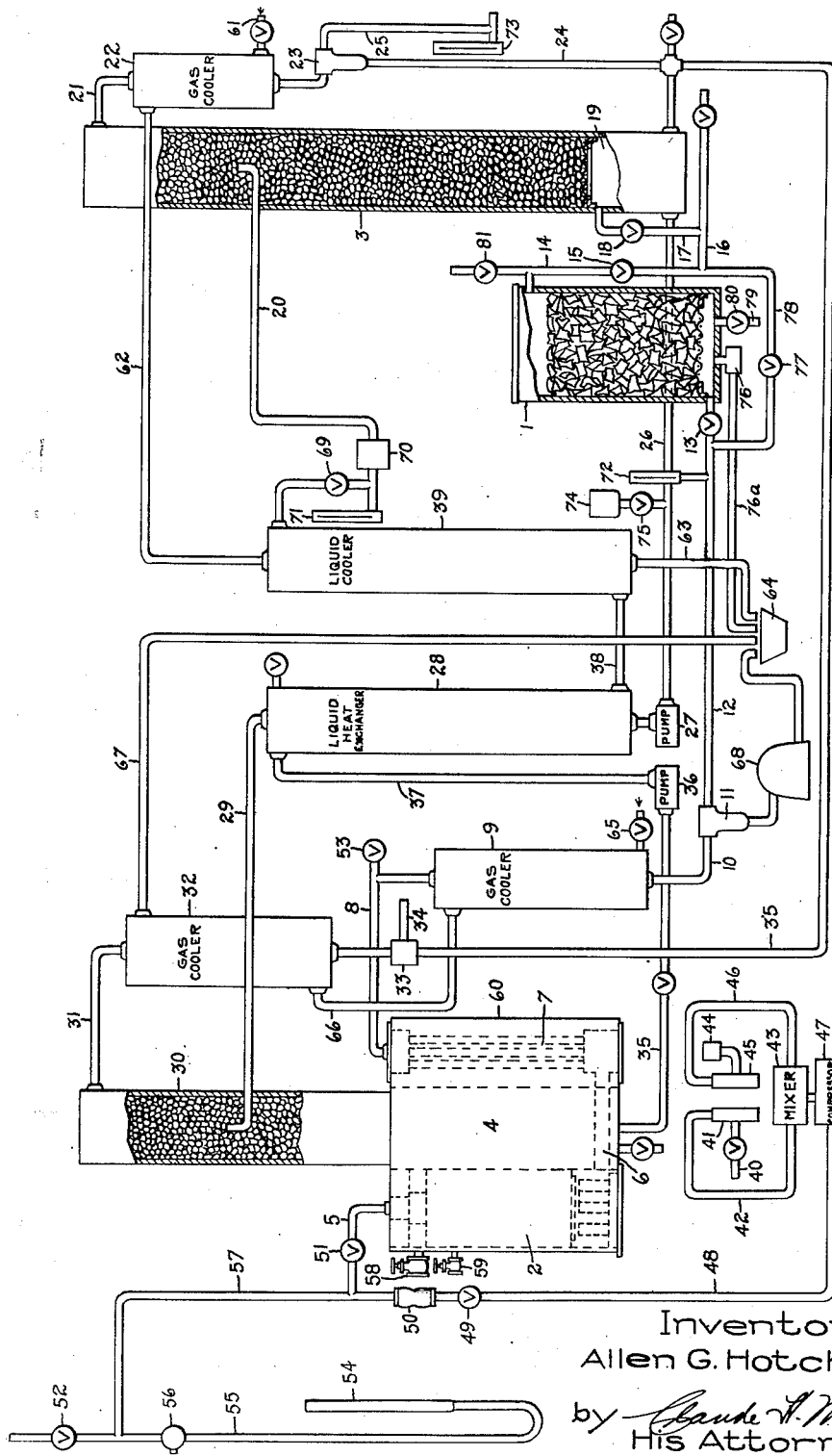

2,768,058

GAS PURIFICATION

Allen G. Hotchkiss, Schenectady, N. Y., assignor to General Electric Company, a corporation of New York Application March 9, 1953, Serial No. 341,247

4 Claims. (Cl. 23—2)

My invention relates to gas purification means for producing carbon dioxide-free dry combusted gas. This gas is extensively used as a protective atmosphere in many industrial operations and is especially suited for use in metal treating furnaces.

Combusted gas is formed by the controlled burning of a hydrocarbon fuel with air. The most commonly employed fuels are gases such as natural gas, coke oven gas, butane and propane. By controlling the air to fuel gas ratio it is possible to produce combusted gases containing varying percentages of hydrogen, carbon monoxide, carbon dioxide, and nitrogen. An output gas analysis chart for combusted gases produced from the burning of natural and coke oven gas fuels is shown in Fig. 2 of my patent 2,085,586 granted June 29, 1937. By referring thereto it will be noted that for increasingly higher ratios of air to fuel the amount of hydrogen and carbon monoxide is reduced and the amount of carbon dioxide increased until at 100% aeration the hydrogen and carbon monoxide content is reduced to zero.

When a combusted fuel gas is used as a protective atmosphere in furnaces used for annealing, normalizing, hardening, brazing, sintering and the like it is often necessary to purify it by removing the carbon dioxide and water vapor therefrom. If the carbon dioxide is not completely removed from a hydrogen and carbon monoxide bearing mixture of low dew point, the water gas reaction which will occur in the furnace chamber, will quickly adjust the equilibrium condition by forming water. This water vapor and the remaining carbon dioxide of such a mixture then cause a decarburizing action on steel articles being treated in the presence thereof. When carbon dioxide is completely removed a fairly stable condition will exist and the amount of moisture present can be adjusted and controlled to the desired degree. Thus for most treatments of medium and high carbon steels it is desirable to use a carbon dioxide-free dry gas atmosphere in the heating furnace.

The carbon dioxide content of a combusted gas may be removed by a suitable absorbent. A mixture of water and monoethanolamine is commonly employed as an absorbent for carbon dioxide and other acidic gases in the combusted gas. One commonly employed mixture contains from 12 to 15% by volume of monoethanolamine. The equipment for removing the carbon dioxide from the combusted gas comprises an absorber tower filled with baffling means in which down flowing absorbent washes the up flowing combusted gas and from which the carbon dioxide-free gas is discharged at the top of the tower while the carbon dioxide and absorbent is removed from the bottom of the tower and passed through another tower in which, by heating, the carbon dioxide is driven out of the absorbent which is collected and returned for reuse in the absorber tower. This treatment of the combusted gases also removes therefrom any other acidic gases such as hydrogen sulfide and sulfur dioxide.

The carbon dioxide-free gas is then dried by passing it through either or both a refrigerated gas cooler and a regenerative-type drier such as described on pages 29 and 30 of the March 1949 issue of the General Electric Review in an article beginning at page 25 thereof and entitled "Protective Atmospheres in Industry—part IV" by H. M. Webber and myself. The drying towers of the regenerative drier are normally filled with activated alumina or silica gel although obviously other chemical drying agents may be employed.

A gas generating equipment for producing a carbon dioxide-free dry combusted gas in accordance with the procedures above described has been disclosed in my application Serial No. 780,482 filed October 17, 1947 allowed August 6, 1952 and entitled, Apparatus and Method for Producing a Gas Atmosphere. When operating this apparatus it was found that under certain conditions the gas leaving the top of the absorber tower contained excess moisture in the form of a heavy fog which was not dispelled by passing it through a gas cooler and a liquid separating trap forming part of the apparatus used. This fog passed through the refrigerated gas cooler used for partially drying the gas and entered the chemical drier which would remove the moisture but was greatly overloaded due to the super saturated condition of the gas. This fog was formed of exceedingly fine particles which could not be removed by any type of filtering or cooling process.

It was found that a slight fog condition might develop when certain natural gases were used as the fuel in the combustion chamber of the generating unit in which the combusted gas was formed and from which it passed to the absorber tower. It was also found that this fog was generated in the absorber tower since the entering gas was free of fog. Formation of this fog was usually associated with the employment of high ratios of air to gas used for combustion in forming the combusted gas. When coke oven gas was used as a fuel conditions were greatly exaggerated over those occurring when using natural gas fuel. As with natural gas, when using coke oven gas the fogging was worse when using high ratios of air to gas.

Sometimes more than 100% aeration is employed in forming a combusted gas as for example when it is used for purging purposes and it is desirable to eliminate carbon monoxide therefrom in order to avoid exposing operating personnel to toxic atmospheres. In one instance the fogging with more than 100% aeration of a natural gas produced conditions that had to be eliminated since the fog of monoethanolamine and water would carry over excessive amounts of the absorbent liquid and the monoethanolamine content thereof would dissolve lubricants used in machines such as compressors located in the gas line.

If carbon dioxide-free combusted gas containing this fog is passed through a heater unit in which the gas and fog are heated to temperatures of from 150 to 200° F., the fog will change to vapor and this vapor can then be condensed out by passing the hot vapor containing gases through a cooler. This heating and cooling operation however is expensive and should be avoided if possible.

It is an object of my invention to provide means for treating combusted gases so that fogging in the absorber tower will not occur and consequently means such as noted above need not be employed for removing the fog which greatly overloads the moisture removing apparatus employed for drying the gas.

I have found that if the combusted gas is fed through a sulfur removing tower such as has been used for many years by gas companies for the removal of hydrogen sulfide from fuel gases, that the combusted gas so treated is completely free of any tendency to form fog when passing through the absorber tower where it is washed with the monoethanolamine solution for removing acidic gases, the principal one of which is carbon dioxide. The sulfur removing tower employed contains active hydrated oxide of iron and an alkali such as lime supported on a fluffing material such as wood shavings. One particular composition employs as the purifying material a colloidal alkalized ferric hydrate mixed with wood shavings, corn cobs or blast furnace slag to form a mixture of from 20 to 25 lbs. of the purifying material to a bushel of the fluffing material. The alkalized ferric hydrate thereof is prepared from the iron bearing material left after alumina has been extracted from bauxite ore by alkalies. It is a finely divided, hydrated oxide of iron free from organic matter and free iron and contains a high percentage of active alkali. This material can be regenerated by passing air through it without removing it from the tower.

This sulfur removing tower is not used to remove hydrogen sulfide from the combusted gas for some combusted gases containing no hydrogen sulfide will produce fogging and a combusted gas that does not produce fogging may have hydrogen sulfide added thereto without producing fogging. Likewise sulfur dioxide added to a combusted gas will not produce fogging but when sulfur dioxide is added to a natural gas burned at a high ratio of air to gas, fogging will be produced and this fogging will become severe when burning a gas containing sulfur dioxide in the presence of an excess amount of air. With excess air, that is more than 100% aeration, a hydrogen sulfide addition to a natural gas will also produce fogging. Thus neither hydrogen sulfide nor sulfur dioxide introduced into the generated gas stream after it has passed through the combustion chamber of the gas generator and before it enters the carbon dioxide removing tower will cause fogging. Sulfur dioxide however when present in the fuel gas which is burned at a high ratio of air to gas and hydrogen sulfide when present in a fuel gas burned at more or less than 100% aeration will produce in the hot combustion chamber of the gas generator a sulfur compound whose presence in the combusted gas stream will cause fogging in the carbon dioxide removing tower. I have found however that by passing this gas through a standard iron oxide tower such as heretofore has been used for hydrogen sulfide removal from natural and coal gas, the combusted gas will be conditioned so that it may be supplied through an absorber tower without the generation of fog in its passage therethrough.

For a more complete understanding of my invention reference should be had to the accompanying drawing which is a diagrammatic representation of apparatus embodying my invention.

The apparatus shown in the accompanying drawing is the same as that shown in Fig. 1 of my application Serial No. 780,482 above referred to with the addition of a sulfur removing tower or gas purifier 1 between the combustion chamber 2 of the combusted gas generator and the absorber tower 3 through which the combusted gas is passed in order to remove carbon dioxide therefrom. It comprises a combined combustion and boiler device 4 in which a fuel gas is burned with air and the heat produced utilized for boiling the carbon dioxide laden absorbing liquid for the purpose of removing the carbon dioxide therefrom and thereby reactivating it for use again in the absorber tower. A fuel gas-air mixture is supplied to this device at a suitable pressure through a pipe 5 into the combustion chamber 2 of the device 4 where it is burned and the products of combustion pass downward through this chamber and a pipe 6 and up through a heat exchanger 7 to a discharge pipe 8. The combustion chamber 2, pipe 6 and heat exchanger 7 are immersed in a carbon dioxide absorbing liquid within device 4 and this liquid is heated to a boiling temperature of substantially 200° F. as a result of this arrangement. This carbon dioxide absorbing liquid consists of a mixture of monoethanolamine and water, the percentage of monoethanolamine being preferably from 12 to 15% by volume. The gas discharged from device 4 through pipe 8 is at a temperature of approximately 300° F. It passes from pipe 8 through a gas cooler 9 wherein the gas is cooled to about 80° F. From cooler 9 the gas passes through a pipe 10, a water separator 11, in which the excess moisture condensed by the cooling is separated out, and then through a pipe 12 and valve 13 to the bottom of the sulfur removing tower 1. The gas passes upward through this sulfur removing tower and is discharged therefrom through a pipe 14, a valve 15, pipes 16 and 17 and a valve 18 to a chamber 19 in the lower end of the carbon dioxide gas absorbing tower 3.

As previously stated, the sulfur removing tower 1 is of the type heretofore commonly used for many years by gas companies for removing hydrogen sulfide from natural and coal gases. This same type of sulfur removing tower has also been used to remove hydrogen sulfide from combusted gases when the carbon dioxide is not removed as when using such gases for protective atmospheres in the bright annealing of copper and non-ferrous metals. These towers comprise an enclosed space containing a hydrated iron oxide supported on a fluffing material such as wood shavings or the like. Preferably the iron oxide also contains some lime so that the iron oxide is neutral or alkaline in nature. As a suitable purifying material I have used a colloidal alkalized ferric hydrate which is a finely divided active hydrated oxide of iron free from organic matter and free iron and containing a high percentage of active alkali. This material was supported on wood shavings in order to form a sponge like material which substantially fills the tower.

The absorber tower 3 is provided with gas inlet and outlet passages and a baffling means therebetween over which the absorbent liquid is applied for stripping the combusted gas of its carbon dioxide content. The baffling means employed may be variously modified and may be formed by plates, pebbles or other suitable packing to effect a reduced rate of gas and liquid flow and efficient contact of the counter flows of gas and liquid passing through the tower. In the arrangement illustrated absorber tower 3 is of the type known as a packed tower and contains a filling of small short porcelain tubes known as Raschig rings over which the carbon dioxide laden gas mixture passes upward and comes into intimate contact with the carbon dioxide absorbing liquid supplied to the tower through a pipe 20. This absorbing liquid in passing downward through the filler material removes substantially all of the carbon dioxide gas from the upwardly moving gas and also the relatively small amounts of sulfur dioxide and any hydrogen sulfide not removed in the sulfur removing tower 1, the gas laden liquid collecting in chamber 19 in the base of the tower. The gas passes out of the absorber tower 3 through a pipe 21 downward through a cooler 22 and through a liquid separator 23 where the liquid, water with a trace of monoethanolamine, condensed by the cooling of the gas is separated out and fed by a pipe 24 into chamber 19. Due to the presence of the sulfur removing tower 1 there is no fogging in the absorber tower 3 and the cooler 22 acts only to remove the condensed vapor which is present in the gas as it leaves the absorber tower through pipe 21. The purified gas is then passed through a pipe 25 to suitable drying apparatus such as referred to above and thence to the furnace or other device making use of this combusted carbon dioxide-free dry gas.

The carbon dioxide laden absorbing liquid is removed from chamber 19 of absorber tower 3 through a pipe 26 by means of a motor driven pump 27 and passed upward through a liquid heat exchanger 28 from which it passes through a pipe 29 to the upper end of the gas separation or reactivating tower 30 which is similar in construction to the absorber tower 3. In the reactivating tower 30 the carbon dioxide laden liquid is discharged over a mass of Raschig rings as in tower 3. As the liquid trickles down over the Raschig rings, which furnish stripping action promoting the release of gases, the liquid is heated still further by the steam vapor arising from the quantity of boiling absorbing liquid in the boiler portion of device 4, the upper end of which is connected to the lower end of tower 30. The released carbon dioxide and hydrogen sulfide if any pass out of the top of the reactivating tower 30 through a pipe 31 and then through a gas cooler 32 and a liquid separator 33 where the liquid condensed out by cooling is separated while the gases escape to the atmosphere through a pipe 34. The liquid from separator 33 which may contain a small amount of monoethanolamine is returned by a pipe 35 to chamber 19 in the base of absorber tower 3.

The reactivated hot liquid in the boiler portion of device 4 is drawn off from near the top of boiler 4 through a pipe 35 by means of a motor driven pump 36 and fed through a pipe 37 to the heat exchanger 28. From this heat exchanger the liquid passes through a pipe 38 to a cooler 39 where its temperature is reduced to about 100° F. The liquid is then passed through pipe 20 to the top portion of the absorber tower 3 as previously described.

The fuel gas to be burned in device 4 is fed in through a pipe 40, a flowmeter 41 and a pipe 42 to a proportioning mixer 43 while a predetermined amount of air is fed into the mixer through a strainer 44, a flowmeter 45 and a pipe 46. From the mixer 43, which comprises also a gas governor for equalizing the gas and air pressures, the mixed gas and air passes to a compressor 47, the mixer and compressor being driven by a suitable electric motor, not shown. From the compressor the mixture at a suitable pressure such as 2 lbs. per sq. in. passes through a pipe 48, a valve 49, a fire check 50 and a valve 51 to the feed pipe 5.

In starting, valve 51 is closed and a valve 52 in pipe line 57 is opened to allow the mixture of gas and air to escape from pipe line 48 through pipe line 57 to atmosphere until mixer 43 has been adjusted to give the desired proportions. Then valve 52 is closed and valve 51 opened. At this time a valve 53 is also opened to prevent any excessive pressure in pipe 8.

The air and gas mixture in combustion chamber 2 is lighted by means of a lighter torch 54 which is connected through a rubber hose 55 and a valve 56 to pipe 57 which connects with pipe 48. Valve 56 is opened and the gas lighted as it escapes from the end of torch 54 which constitutes a burner. The burner end of the torch will be heated to a red hot temperature very quickly if the gas and the air proportions are correct. This heating as observed by the operator constitutes a check on the operation of mixer 47. A valve 58 giving access to combustion chamber 2 is now opened and the heated end of torch 54 is inserted into the combustion chamber for lighting the gas mixture therein after which the torch is removed and valve 58 is closed. A second valve 59 leads into combustion chamber 2 and constitutes when opened a sight opening whereby the temperature and state of combustion can be observed. The outer end of this valve 59 is closed by a heat refractory transparent material. After the gas has been lighted valve 53 is closed.

The apparatus is started with a predetermined amount of absorbing liquid in the boiler 60 of device 4 and in the pipes connected therewith. Preferably valve 53 remains open until the liquid in tank 60 is heated to a boiling temperature so that the carbon dioxide gas will be driven off from any carbon dioxide laden liquid pumped from the absorbing tower 3. Then valve 53 is closed and the pumps 27 and 36 started.

Any suitable construction can be used for coolers 9, 22, 32 and 39 and heat exchanger 28. In the case of the coolers, cooling water is circulated through the tank while the gas or liquid to be cooled is passed through a plurality of tubes inside the tank. In heat exchanger 28 pipe 38 preferably leads into the shell thereof and pump 27 is connected to the tubes therein. Cooling water is admitted through a pipe 61 to cooler 22 and flows therefrom through a pipe 62, cooler 39 and pipe 63 to the sump or drain 64. In a similar manner cooling water is suplied through a pipe 65 to cooler 9 and from this cooler through a pipe 66, cooler 32 and pipe 67 to drain 64. Liquid from separator 11 passes through a float trap device 68 to drain 64.

Preferably enough heat is prodced in combustion chamber 2 of device 4 to maintain the absorbing liquid in boiler 60 at a boiling temperature with the liquid pumped at full volume as long as the consumption of gas from the apparatus is over 50% of its maximum capacity. It will be understood that compressor 47 maintains a constant pressure irrespective of the volume of gas and air mixture suplied and consequently when the amount of gas taken from pipe 25 decreases, a smaller amount of mixed air and fuel gas is supplied to the combustion chamber. When the demand decreases to 50% or below of the maximum for the apparatus as indicated by flowmeters 41 and 45, a valve 69 in pipe line 20 is partially closed so as to decrease the circulation of absorbing liquid as indicated by the flowmeter 70. Additional checks on the operation of the apparatus are given by thermometers 71, 72 and 73 which indicate the temperature of the liquid or gas at these points.

The absorbing liquid may be replenished by means of a funnel 74 connected through a valve 75 to pipe line 26. A liquid level indicator, not shown, is provided on the boiler and also a pressure gage, also not shown. Also variously normally closed valves are provided for use in draining and cleaning the apparatus.

The sulfur removing tower or purifier 1 is provided with a detachable cover at its top so that the purifying material therein may be removed and replaced when necessary. The bottom of this tower is provided with a condensate trap 76 which is connected through a drain pipe 76a to sump 64. This sulfur removing tower may be removed from the combusted gas pipe line by closing valves 13 and 15 and opening a valve 77 in a by-pass pipe line 78 so that the combusted gases are directly supplied to the chamber 19 at the bottom of absorber tower 3. When thus removed the filling material in the sulfur removal tower 1 may be reactivated by suplying compressed air through a pipe 79 and a valve 80 and this compressed air after flowing through the filling material in tower 1 is discharged therefrom through pipe 14 and a valve 81 to the atmosphere. It is desirable to periodically reactivate the filling material in the sulfur tower although it has been found that even a spent material therein will still have desired refining action on the combusted gases so that when these gases are suplied to the absorber tower they will not produce the disagreeable misting or fog conditions which it is desired to eliminate in accordance with my invention.

It is of course apparent that my invention is not limited to its application in the particular system described above since various rearrangements and the elimination or addition of parts may be made in this system without departing from my invention. So long as the combusted gases are fed through the sulfur removing tower before being fed to the absorber tower, the purified gas leaving the top of the absorber tower will be free of fog.

What I claim as new and desire to secure by Letters Patent of the United States is:

1. In a method of generating gas wherein a hydrocarbon fuel and air are burned in a combustion chamber to form a combusted gas and said combusted gas is passed through carbon dioxide removing means utilizing a water solution of monoethanolamine to remove carbon dioxide from said combusted gas, the step comprising, prior to passing said combusted gas through said carbon dioxide removing means, passing said combusted gas through an enclosed space containing hydrated ferric oxide, whereby formation of fog in said combusted gas as it passes through said carbon dioxide removing means is prevented.

2. In a method of generating gas wherein a hydrocarbon fuel and air are burned in a combustion chamber to form a combusted gas and said combusted gas is passed through carbon dioxide removing means utilizing a water solution of monoethanolamine to remove carbon dioxide from said combusted gas, the step comprising, prior to passing said combusted gas through said carbon dioxide removing means, passing said combusted gas through an enclosed space containing iron oxide impregnated wood shavings, whereby formation of fog in said combusted gas as it passes through said carbon dioxide removing means is prevented.

3. In a method of generating gas wherein a hydrocarbon fuel and air are burned in a combustion chamber to form a combusted gas and said combusted gas is passed through carbon dioxide removing means utilizing a water solution of monoethanolamine to remove carbon dioxide from said combusted gas, the step comprising, prior to passing said combusted gas through said carbon dioxide removing means, passing said combusted gas through an enclosed space containing a porous mass of loose particles having an extended surface area coated with a colloidal alkalized ferric hydrate, whereby formation of fog in said combusted gas as it passes through said carbon dioxide removing means is prevented.

4. In a method of generating gas wherein a hydrocarbon fuel and air are burned in a combustion chamber to form a combusted gas and said combusted gas is passed through carbon dioxide removing means utilizing a water solution of monoethanolamine to remove carbon dioxide from said combusted gas, the step comprising, prior to passing said combusted gas through said carbon dioxide removing means, passing said combusted gas through an enclosed space containing a porous mass of loose particles having an extended surface area coated with a finely divided hydrated oxide of iron containing lime in sufficient quantity to produce alkalinity, whereby formation of fog in said combusted gas as it passes through said carbon dioxide removing means is prevented.

References Cited in the file of this patent

UNITED STATES PATENTS

| | | |
|---|---|---|
| 1,934,242 | Smyly | Nov. 7, 1933 |
| 2,314,827 | Hortvet | Mar. 23, 1943 |